(12) United States Patent
Lutz

(10) Patent No.: US 12,091,080 B2
(45) Date of Patent: Sep. 17, 2024

(54) STEERING WHEEL ASSEMBLY FOR A VEHICLE

(71) Applicant: VOLVO TRUCK CORPORATION, Gothenburg (SE)

(72) Inventor: Damien Lutz, Caluire Et Cuire (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/181,243

(22) Filed: Mar. 9, 2023

(65) Prior Publication Data

US 2023/0373555 A1 Nov. 23, 2023

(30) Foreign Application Priority Data

May 23, 2022 (EP) ..................................... 22174895

(51) Int. Cl.
*B62D 1/19* (2006.01)
*B62D 1/184* (2006.01)

(52) U.S. Cl.
CPC ............. *B62D 1/197* (2013.01); *B62D 1/184* (2013.01)

(58) Field of Classification Search
CPC ......... B62D 1/197; B62D 1/184; B62D 1/195
See application file for complete search history.

(56) References Cited

U.S. PATENT DOCUMENTS

| | | | |
|---|---|---|---|
| 6,035,739 A * | 3/2000 | Milton | B62D 1/184 280/775 |
| 6,460,427 B1 | 10/2002 | Hedderly | |
| 7,191,679 B2 * | 3/2007 | Tomaru | B62D 1/181 280/775 |
| 11,383,756 B2 * | 7/2022 | Ryne | B62D 1/185 |
| 11,459,024 B2 * | 10/2022 | Sjenar | B62D 5/006 |

(Continued)

FOREIGN PATENT DOCUMENTS

| | | |
|---|---|---|
| WO | 2015178829 A1 | 11/2015 |
| WO | 2021032525 A1 | 2/2021 |

OTHER PUBLICATIONS

Extended European Search Report in corresponding European Application No. 22174895.7 dated Nov. 15, 2022 (8 pages).

*Primary Examiner* — Drew J Brown
(74) *Attorney, Agent, or Firm* — Venable LLP; Jeffri A. Kaminski

(57) ABSTRACT

A steering column assembly for motor vehicles, includes a steering wheel, a steering shaft housing unit including a steering shaft that is joined to the steering wheel. The steering shaft housing unit is pivotally connected to a supporting bracket about a first shaft, said supporting bracket being pivotally connected to a vehicle body about a second shaft First and/or second adjusting means adjust the angular position of the steering shaft housing unit relative to the supporting bracket and the angular position of the supporting bracket relative to the vehicle body. A first locking means locks the steering shaft housing unit in a locked position until a kinetic energy transmitted to the steering wheel is less than a threshold value, the first locking means incorporating collapsible means adapted to collapse when the kinetic energy transmitted to the steering wheel is above said threshold value, in which at least a part of the kinetic energy transmitted to the steering wheel is absorbed by the collapsible means.

12 Claims, 6 Drawing Sheets

(56) References Cited

U.S. PATENT DOCUMENTS

| | | | |
|---|---|---|---|
| 11,753,063 B2* | 9/2023 | Ku | B62D 1/181 |
| | | | 74/493 |
| 2015/0239489 A1* | 8/2015 | Matsuno | B62D 1/189 |
| | | | 74/493 |
| 2018/0319419 A1 | 11/2018 | Kreutz et al. | |
| 2020/0055538 A1* | 2/2020 | Davies | B62D 1/184 |
| 2021/0009189 A1 | 1/2021 | Munding et al. | |

* cited by examiner

STEERING WHEEL ASSEMBLY FOR A VEHICLE

TECHNICAL FIELD

The invention relates to a steering wheel assembly for a vehicle.

The invention can be applied in heavy-duty vehicles, such as trucks, buses and construction equipment, or in other vehicles, such as a car.

BACKGROUND

Conventional vehicles are fitted with a steering wheel to control the orientation of the wheels via a steering column. Such a steering wheel is made up of a steering wheel ring, a hub and one or more radial spokes that connect the steering wheel ring to the hub. The steering wheel hub causes a steering shaft to rotate. Other accessories, such as an air bag or a horn pad, may also be contained in, or disposed on, the steering wheel hub.

Vehicles generally have a steering wheel adjusting mechanism with which a driver may adjust the steering wheel in a position that is suitable for the present driver by partly displacing the steering wheel and/or the steering column forwards and backwards relative to the direction of travel of the vehicle and partly, simultaneously or as an option, tilt the steering wheel and that to the steering wheel attached steering column in order to change the angular position of the steering wheel and the steering column relative to the vehicle. The steering wheel adjusting mechanism is lockable in such a way that the steering wheel and that to the steering wheel attached steering column after adjustment may be locked in a desired position relative to the vehicle at the same time as the steering wheel and that to the steering wheel attached steering column still may be turned around the axis of the steering column thereby enabling steering of the vehicle.

One example of a steering wheel adjusting mechanism for motor vehicles comprises a supporting arm pivotally attached to a part fixed on the vehicle, and a pivotally to the supporting arm attached steering shaft housing unit. The supporting arm is further attached over a first locking plate package to the steering shaft housing unit and over a second locking plate package to the fixed part of the vehicle in order, with these locking plate packages, to lock the steering shaft housing unit relative to the vehicle. The locking effect results from the friction between friction plates in each locking plate package.

A problem with such a steering wheel adjusting mechanism is that it cannot prevent a displacement of the steering column during a collision. In particular, in conventional heavy vehicles, such as trucks, the steering column tends to rotate toward the windshield under the effect of the system mass inertia during a frontal collision. This leads to an upward displacement of the steering wheel during a collision, which may lead to a dangerous position of the steering wheel relative to the driver. Indeed, if the driver is thrown forwards, it is highly probable that he will bump against the steering wheel with his chest, neck or face, which increases the risk of serious personal injury for the driver. This risk is not lowered by the airbag, because the airbag in the steering wheel develops essentially upwards instead of in the direction towards the driver during a collision, and does not give the driver the intended and necessary protection.

SUMMARY

An object of the invention is to provide a steering column assembly, especially for trucks, that maintains the steering wheel at its optimal orientation relative to the driver during a collision, thus lowering the risk of serious injury for the driver.

Thus, the locking means of the steering column assembly permits to keep the angular position of the steering wheel relative to the vehicle body during the short time period that follows a collision event and before the driver impacts the steering wheel. Furthermore, once the driver is impacting the steering wheel, the collapsible means permit to at least partially absorb the kinetic energy transmitted by the driver, thus reducing the reaction force transmitted by the steering column, and permit to maintain the steering wheel in an optimal orientation for the driver during the collision event.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
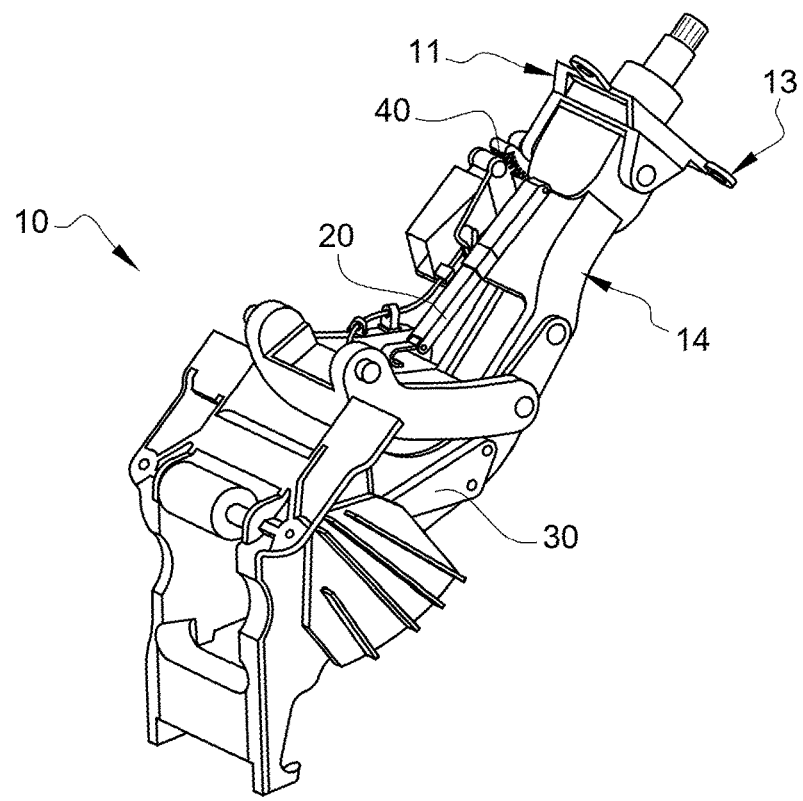
FIG. 1 is a perspective view of one embodiment of a steering column assembly according the invention.
Figure 2:
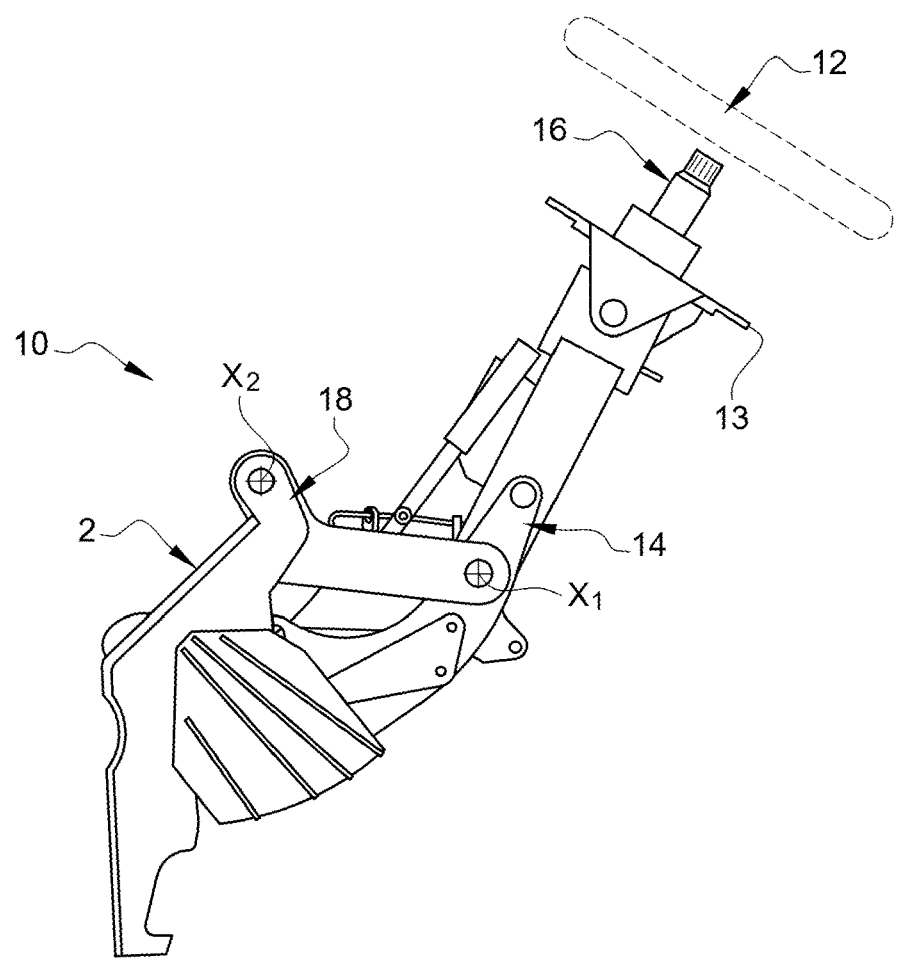
FIG. 2 is a side view of steering column assembly shown in FIG. 1.
Figure 3:
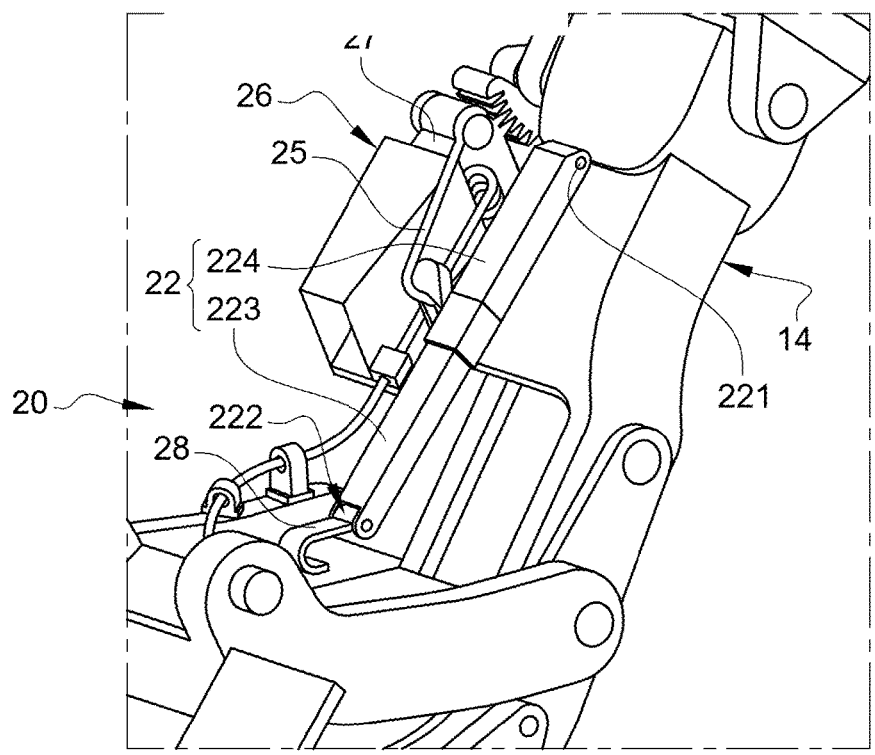
FIG. 3 is an enlarged view of the locking arm of the steering column assembly shown in FIG. 1.

FIGS. 1 and 2 respectively show perspective and side views of an embodiment of a steering column assembly 10 for a motor vehicle. The steering column assembly 10 comprises a steering wheel 12 integral in rotation with a steering wheel housing unit 11, said steering wheel housing unit 11 including a bearing device 13 in which is pivotally mounted a steering shaft 16 that is attached to the steering wheel 12. The steering shaft 16 is mounted in a steering shaft housing unit 14 that is pivotally connected to a supporting bracket 18 about a first axis X1. This supporting bracket 18 is pivotally connected to a vehicle body 2 about a second axis X2.

The angular position of the steering shaft housing unit 14 relative to the supporting bracket 18 may advantageously be adjusted by first adjusting means and the angular position of the supporting bracket 18 relative to the vehicle body 2 may advantageously be adjusted by second adjusting means, so that the driver can adjust the position of steering wheel to his own needs. Third adjusting means may also be provided to adjust the orientation of the steering wheel 12 relative to the steering shaft housing 14.

The first, second and third adjusting means may advantageously comprise electric motors adapted to move the steering shaft housing unit 14, the supporting bracket 18 and the steering wheel 12 respectively.

As shown in FIG. 1, the steering column assembly 10 further comprises first locking means 20 and second locking means 30 that are adapted to lock the steering shaft housing unit 14 and support 18 in a locked position during a collision event.

Figure 7:
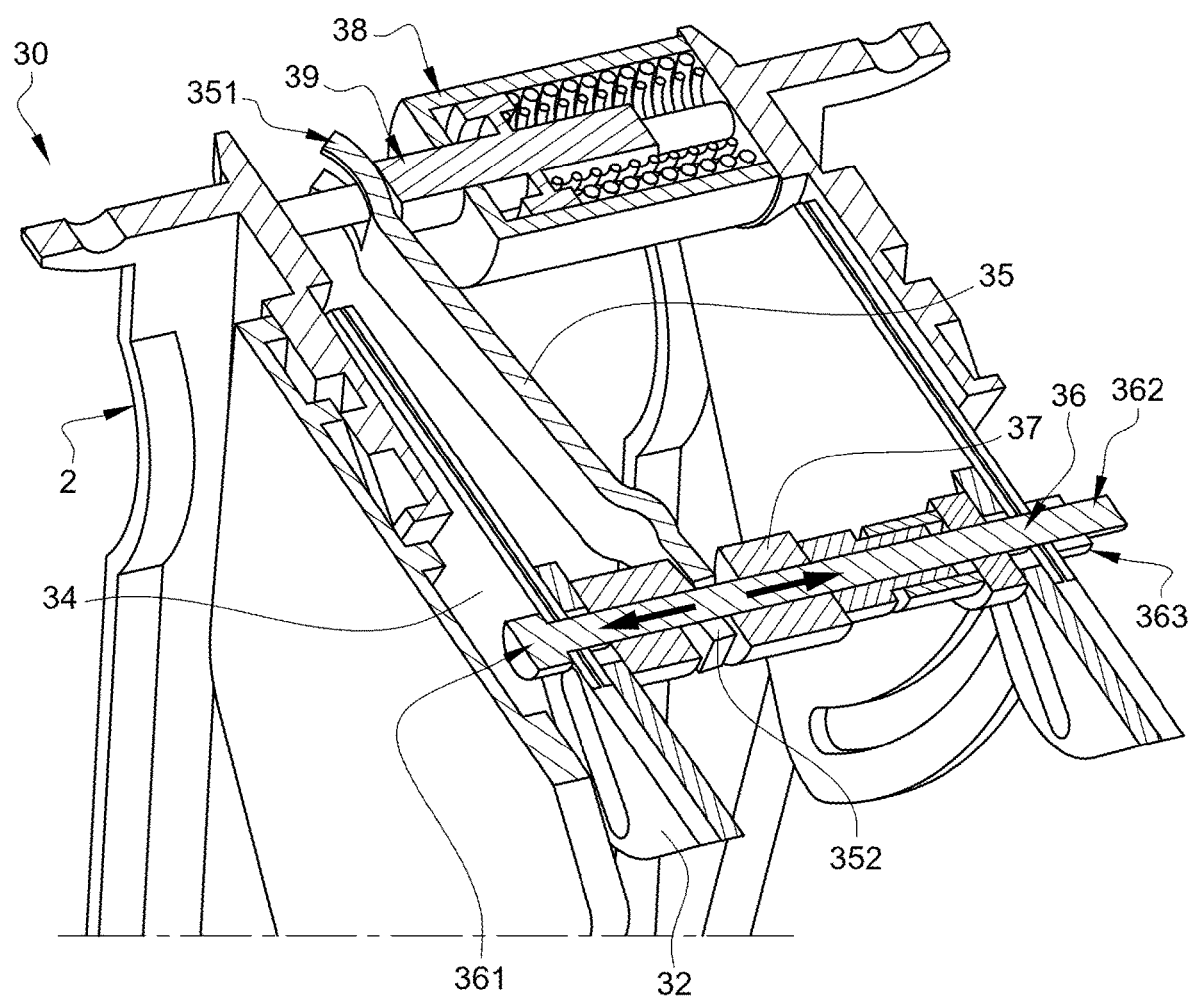
FIG. 7 is a cross-sectional view of the locking friction plate sets of the steering column assembly shown in FIG. 1.

The second locking means 30 are conventional and consist in lamellar package that holds the steering shaft housing unit 14 and support 18 at a desired position during normal use with the aid of friction. A specific embodiment of such lamellar package is illustrated in FIG. 7. In this embodiment, the second locking means 30 comprise a first set of thin friction plates 32 joined to the steering shaft housing unit 14 and a second set of thin friction plates 34 joined to the vehicle body 2, each friction plate 34 of second set being disposed between two adjacent friction plates 32 of the first set. The first and second sets of friction plates 32, 34 are slidably mounted along a support bar 36 that extends between a first T-shape end 361 and a second end 362, a nut 363 being threadedly connected to the support bar 36 near the second end 362. The first end 361 define a first abutment for the friction plates 32, 34 and the nut 363 define a second abutment for the friction plates 32, 34. A piston 37 is slidably mounted along the support bar 36, so that it can apply a compression force Fc on the friction plates 32, 34 when it moves toward the first and second ends 361 and 362 of the support bar 36, the friction plates 32, 34 being compressed between the piston 37 and the first abutment or the second abutment. The compression force Fc applied by the piston 36 is controlled by a cylinder 38 that is adapted to induce a pivoting movement to a fork element 35 via a cylinder rod 39, which pushes against a fork end 351 of the fork element 35, the other end 352 thereof being integral in translation with the piston 36. A sliding movement of the piston 36 may thus be induced by the cylinder 38.

As shown in FIGS. 3 to 6, the first locking means 20 comprise a locking arm 22 extending between an upper end 221 pivotally connected to the steering shaft housing unit 14 and a lower end 222 pivotally connected to a collapsible element 28 that is fixedly connected to the supporting bracket 18. The distance between the upper end 221 and the lower end 222 may advantageously be adjusted so that the length L0 of the locking arm 22 (see FIG. 9a) can be adjusted depending on the angle α1 of the steering shaft housing unit 14 relative to the horizontal in the normal position of use. In the embodiment shown, this adjustment is possible by using a telescopic locking arm 22. The locking arm 22 thus comprises a first section 223 and a second section 224, the first section 223 being telescopically received inside the second section 224. The first section 223 has a toothed profile 225 along its outer periphery, said toothed profile 225 being adapted to interact with a locking pin 24 to lock the locking arm 22 in the position of use shown in FIG. 9a. The locking pin 24 is provided with a bevelled end 243 and is pivotally movable about a pivot shaft 241 between two positions, respectively an engagement position, in which the locking pin 24 engages the toothed profile 225 of the locking arm 22, the bevelled end 243 being positioned between two contiguous teeth of said toothed profile 225, thus preventing any relative displacement between the first and second sections 223 and 224, and a disengagement position, in which the locking pin 24 is disengaged from the toothed profile 225, the bevelled end 243 being slightly away from the teeth of the toothed profile 225, thus allowing a relative displacement between the first and second sections 223 and 224. This disengagement position thus allows an adjustment of the length L0 of the locking arm 22. The second section 224 is advantageously provided with an aperture 226 facing the toothed profile 225 of the first section 223, said aperture 226 being configured to allow the bevelled end 243 to pass through the second section 224 when the locking pin 24 moves from its release position to its locking position and vice versa.

Figure 8A:
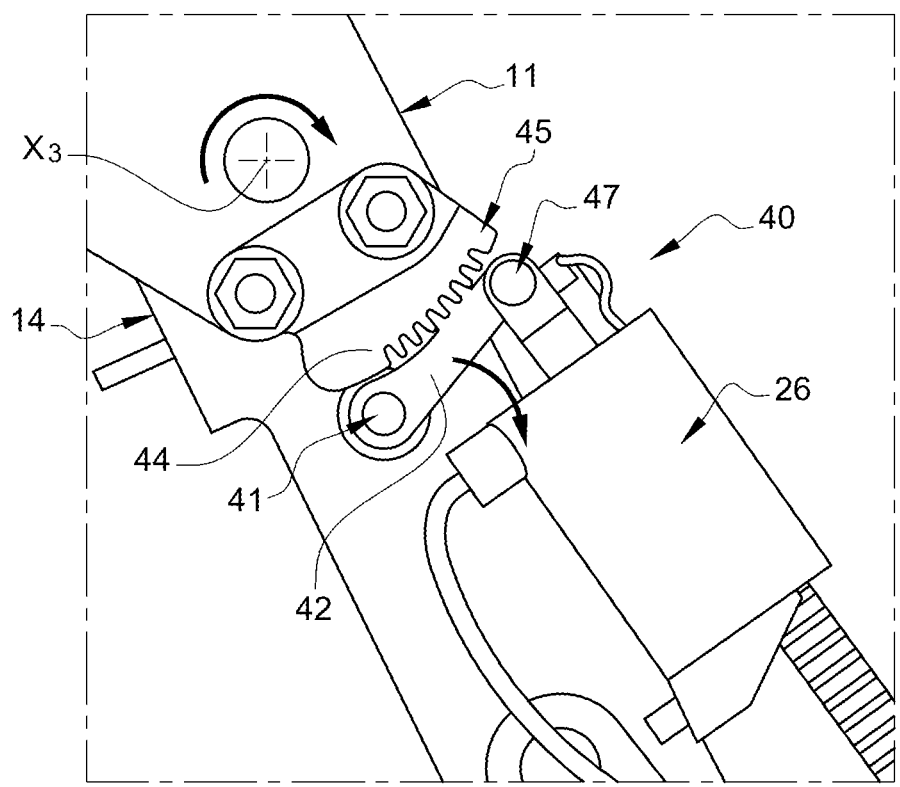
FIG. 8*a* is an enlarged view of the steering wheel locking lever of the steering column assembly shown in FIG. 1, in its locked position.
Figure 8B:
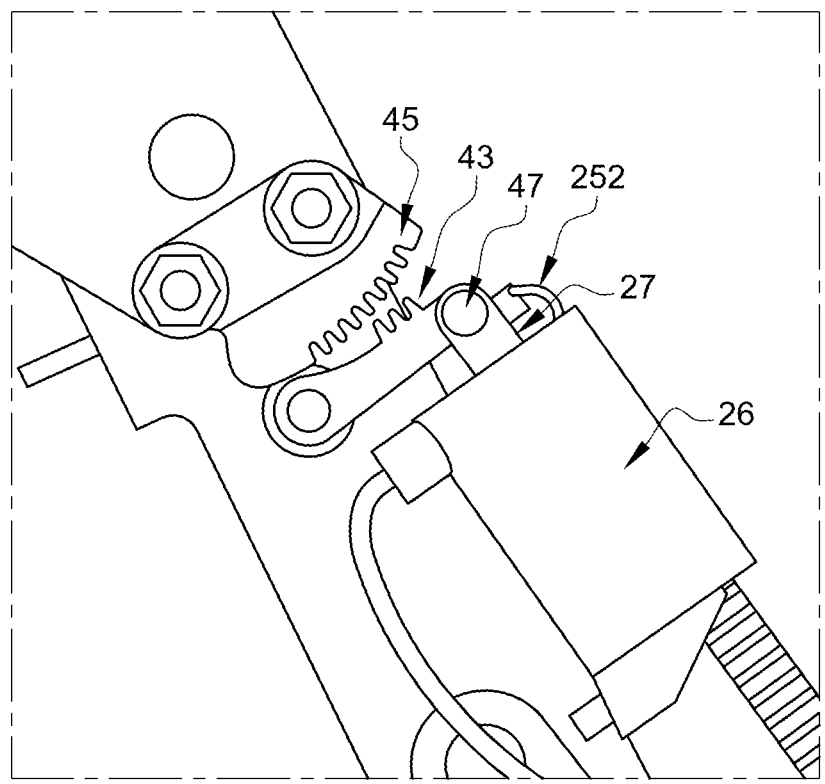
FIG. 8*b* illustrates the steering wheel locking lever shown in FIG. 8*a*, in its release position.

The movement of the locking pin 24 from its engagement position to its disengagement position is actuated by a release rod 25 that is slidably connected to the locking pin 24. The release rod 25 comprises one lower end section 251 that is slidably received in a slot 242 of the locking pin 24 and one upper end section 252 that is pivotally connected to cylinder rod 27 of a cylinder 26 (see FIG. 8b). When the cylinder 26 moves the cylinder rod 27 along a longitudinal direction, it induces an upward movement of the upper end section 252 and of the lower end section 251. During its upward movement, the lower end section 251 follows a cam profile defined by the slot 242 and causes the locking pin 24 to pivot about the pivot shaft 241 from its engagement position to its disengagement position. The locking pin 24 is advantageously biased from its disengagement position to its engagement position under the action of a return spring 23.

Figure 4:
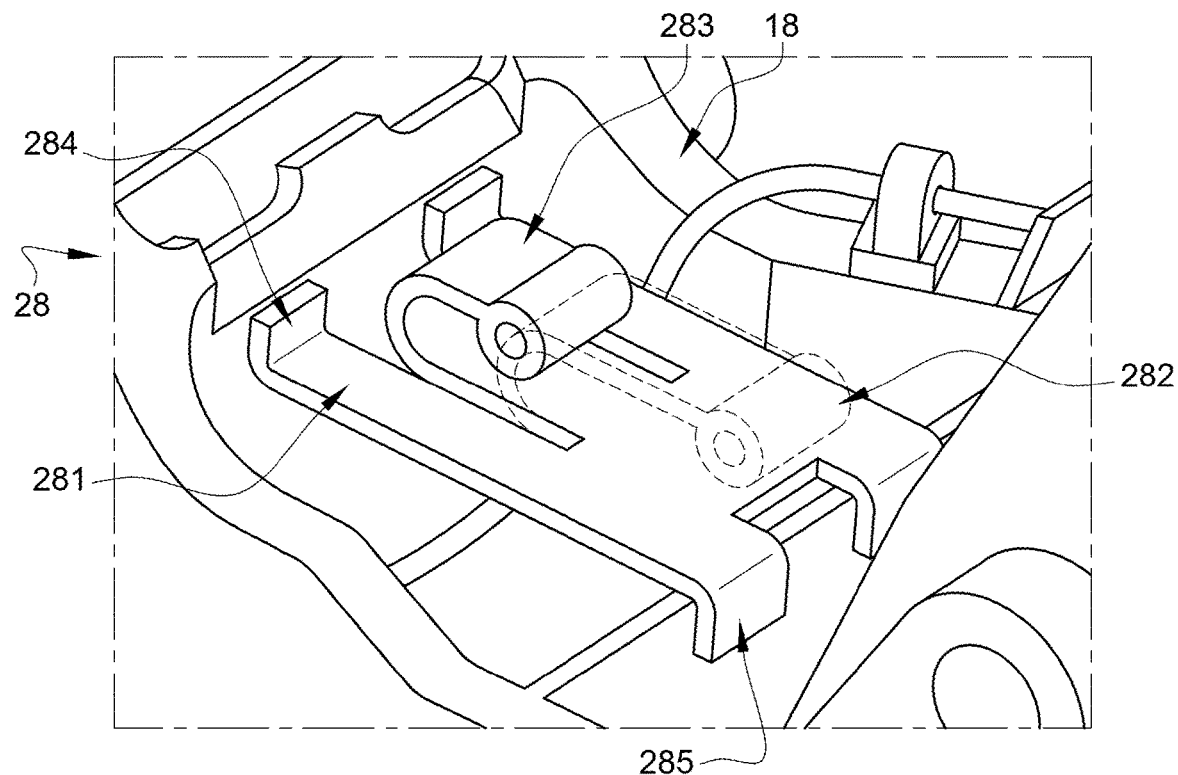
FIG. 4 is an enlarged view of the compressible element of the steering column assembly shown in FIG. 1.
Figure 5:
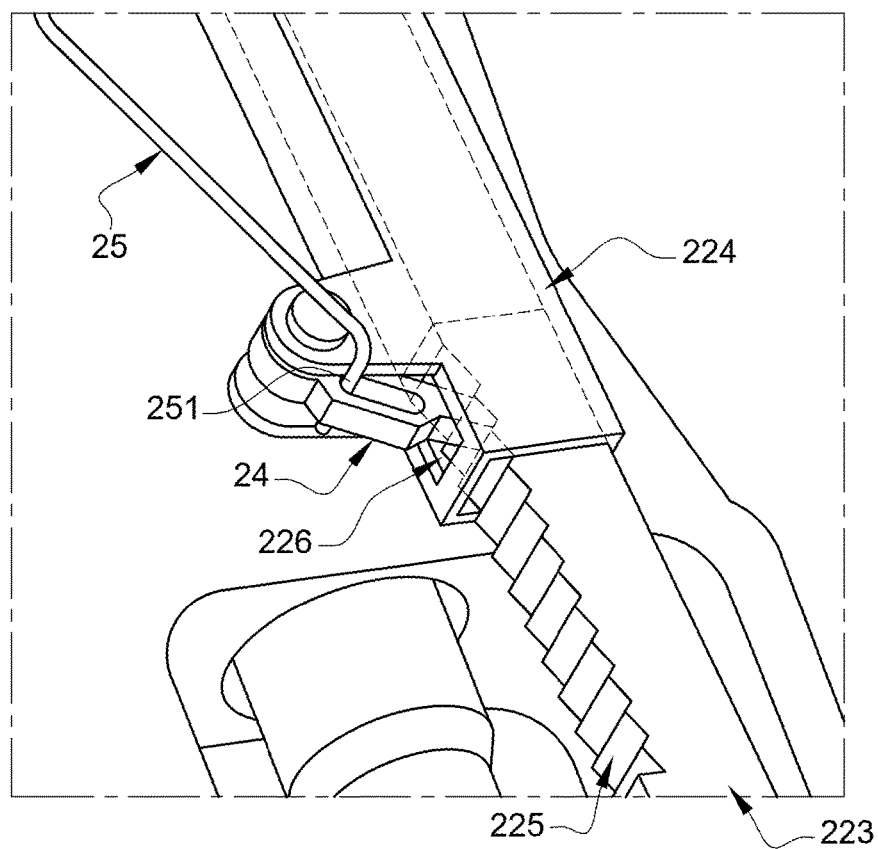
FIG. 5 is a bottom view of the locking pin of the steering column assembly shown in FIG. 1.
Figure 6:
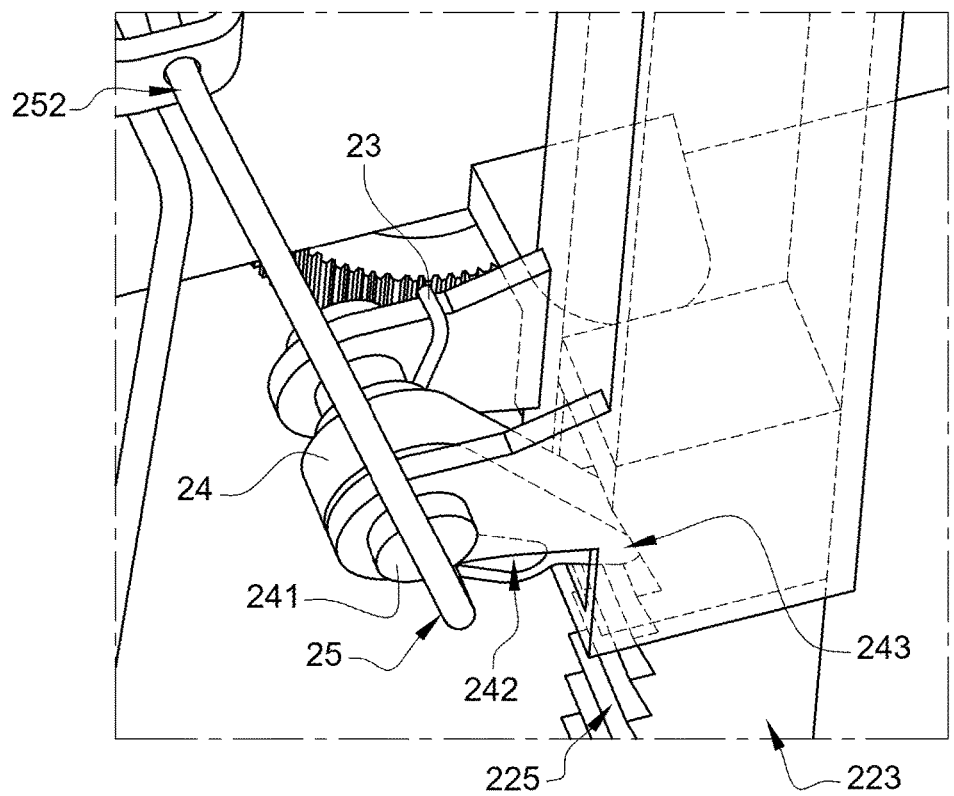
FIG. 6 is a top view of the locking pin shown in FIG. 5.

In the exemplary embodiment shown in FIG. 4, the collapsible element 28 may comprise a bottom plate 281 that is fixedly connected to the supporting bracket 18, the bottom plate 281 extending between a first end 284 and a second end 285. A U-shape central section 283 of the bottom plate 281 pivotally supports the locking arm 22 at its free end 282. The central section 283 is deformable under the force applied by the locking arm 22 so that its free end 282 is movable relative to the bottom plate 281 between an initial position (corresponding to the non-deformed state of the collapsible element 28), in which it is close to the second end 285 of the bottom plate 281, and a final position (corresponding to the totally deformed state of the collapsible element 28), in which it is close to the first end 284 of the bottom plate 281. As explained in the following paragraphs, the deformation of the central section 283 may not occur as long as the force applied by the locking arm 22 is less than a threshold value.

As illustrated in FIG. 1, the steering column assembly 10 of the present invention may also comprise third locking means 40 to lock the steering wheel housing unit 11 in a specific angular position relative the steering shaft housing unit 14. Such third locking means 40 are for example illustrated in FIGS. 8a and 8b. They comprise a locking lever 42 having a tooth profile 43 along its upper side, the locking lever being pivotally connected to the steering shaft housing unit 14 about a pivot shaft 41. A free end 47 of the locking lever 42, which is integral in translation with the cylinder rod 27, is movable under the action of the cylinder 26 between a locked position, illustrated in FIG. 8a, and a release position, illustrated in FIG. 8b. In the locked position, the teeth of the toothed profile 43 of the locking lever 42 are engaged with corresponding teeth 45 of a gear 44 fixedly connected to the steering wheel housing unit 11, thus preventing any angular displacement between the steering wheel housing unit 11 and the steering shaft housing unit 14.

In the release position, the free end 47 of the locking lever 42 is closer to the cylinder 26 than in the locked position, the teeth of the toothed profile 43 of the locking lever 42 thus being disengaged from the teeth 45 of the gear 44, thus allowing an angular displacement between the steering wheel housing unit 11 and the steering shaft housing unit 14.

Figure 9A:
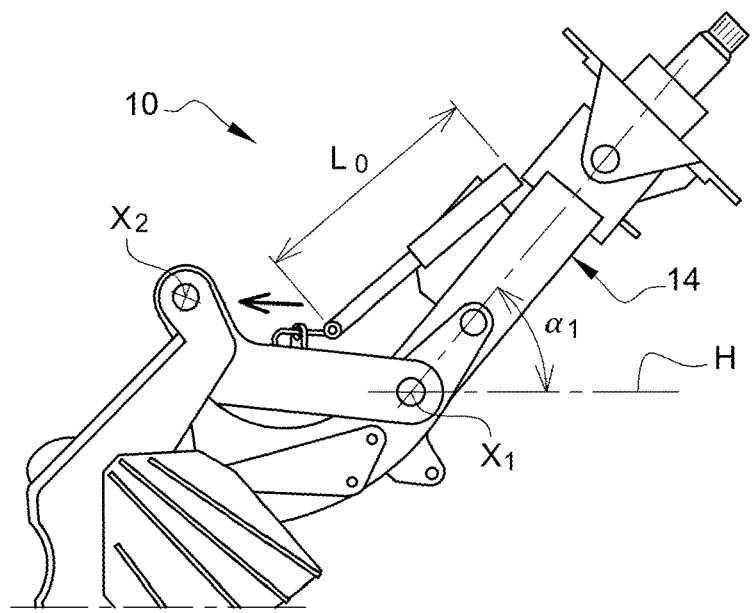
FIG. 9*a* shows the steering column assembly of FIG. 2 before a collision event.
Figure 9B:
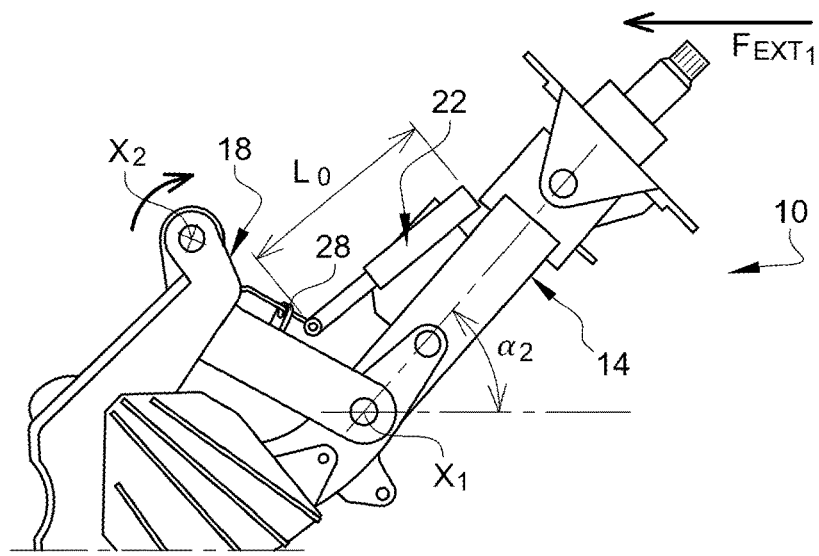
FIG. 9*b* shows the steering column assembly of FIG. 2 after a collision event and before the driver impacts the steering wheel.
Figure 9C:
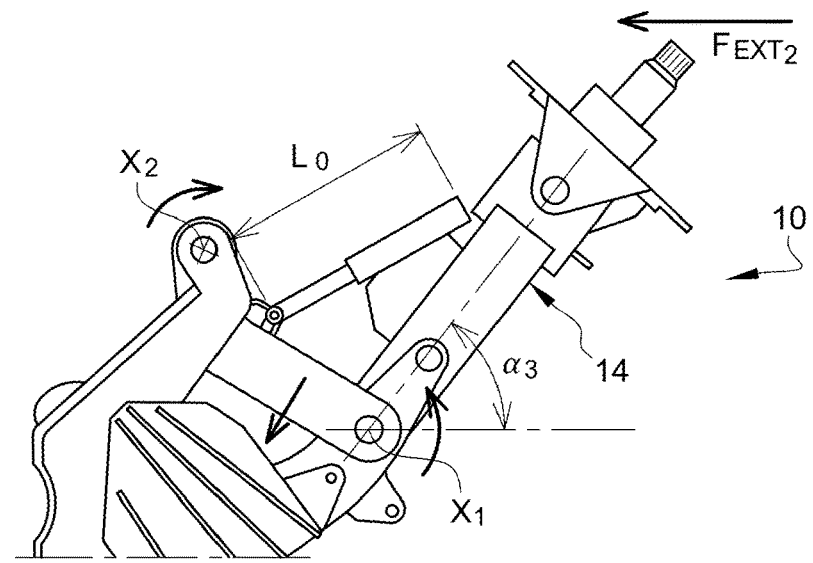
FIG. 9*c* shows the steering column assembly of FIG. 2 after a collision event and after the driver impacts the steering wheel.

The successive positions taken by the steering wheel assembly 10 during a collision event are illustrated in FIGS. 9*a* to 9*c*.

In FIG. 9*a*, the steering wheel assembly 10 is in its normal position of use, before the collision event occurs. The angle of the steering shaft housing unit 14 relative to the horizontal H is equal to an initial value α1.

In FIG. 9*b*, the steering wheel assembly 10 is shown just after the collision event occurs and before the driver impacts the steering wheel. The collision event corresponding to a frontal collision, a force $F_{EXT1}$ exercised by the inertia is thus applied in the forward vehicle direction. This force $F_{EXT1}$ transmits a kinetic energy E1 to the steering shaft housing unit 10. The angular position of steering wheel assembly 10 relative to the supporting bracket 18 being locked by the locking arm 22, this kinetic energy E1 leads to a rotation of the supporting bracket 18 about the second shaft X2. The angle of the steering shaft housing unit 14 relative to the horizontal H thus slightly increases to a value α2. Until the kinetic energy E1 transmitted to the steering shaft housing unit 10 is below a threshold value Et, the collapsible element 28 stays in its non-deformed state.

In FIG. 9*c*, the steering wheel assembly 10 is shown after the collision event occurs and after the driver impacts the steering wheel. The driver thus exercises a force $F_{EXT2}$ in the forward vehicle direction. This force $F_{EXT2}$ transmits a kinetic energy E2 to the steering shaft housing unit 10. This kinetic energy E2 being greater than the threshold value Et, this leads to a deformation of the collapsible element 28 that reaches its totally deformed state, and to both a rotation of the supporting bracket 18 about the second shaft X2 and a rotation of the steering shaft housing unit 10 about the first shaft X1. The combination of these two rotational movements results in a downward translation of the whole system. The angle of the steering shaft housing unit 14 relative to the horizontal H thus slightly decreases to a value α3, which is close to the initial value α1.

It is to be understood that the present invention is not limited to the embodiments described above and illustrated in the drawings; rather, the skilled person will recognize that many changes and modifications may be made within the scope of the appended claims.

The invention claimed is:

1. A steering column assembly for motor vehicles, comprising:
    a steering wheel,
    a steering shaft housing unit including a steering shaft that is joined to the steering wheel, wherein the steering shaft housing unit is pivotally connected to a supporting bracket about a first shaft, said supporting bracket being pivotally connected to a vehicle body about a second shaft,
    first and/or second adjusting means adapted to adjust the angular position of the steering shaft housing unit relative to the supporting bracket and the angular position of the supporting bracket relative to the vehicle body,
    wherein the steering column assembly further comprises a first locking element adapted to lock the steering shaft housing unit in a locked position until a kinetic energy transmitted to the steering wheel, in particular during a collision event, is less than a threshold value, the first locking element incorporating a collapsible element adapted to collapse when the kinetic energy transmitted to the steering wheel is above said threshold value, thus leading to the displacement of the steering shaft housing unit from the locked position to a final position, in which at least a part of the kinetic energy transmitted to the steering wheel has been absorbed by the collapsible element, wherein the collapsible element comprises a bottom plate that is fixedly connected to the supporting bracket, the bottom plate extending between a first end and a second end.

2. The steering column assembly according to claim 1, wherein the first locking element comprises a locking arm extending between an upper end pivotally connected to the steering shaft housing unit and a lower end pivotally connected to a collapsible element that is fixedly connected to the supporting bracket, the collapsible element being configured to collapse under the action of a compression force applied by the locking arm.

3. The steering column assembly according to claim 2, wherein the locking arm comprises a first section and a second section, said first and second sections being telescopically movable relative to each other, the first section having a toothed profile and the second section being provided with an aperture facing said toothed profile and through which a locking pin controlled by an actuator can move to engage the toothed profile, thus locking the locking arm in a normal position of use.

4. The steering column assembly according to claim 3, wherein the actuator is a cylinder that moves a release rod connected to the locking pin between two positions, respectively a locking position, in which the release rod causes the locking pin to engage the toothed profile of the locking arm, and a release position, in which the release rod causes the locking pin to disengage from said toothed profile.

5. The steering column assembly according to claim 4, wherein the locking pin is pivotally connected to the steering shaft housing unit and is provided with a slot adapted to slidably receive one end section of the release rod, said slot defining a cam profile for said end section, so that, when the release rod moves from its locking position to its release position, the end section thereof follows the cam profile and causes the locking pin to pivot between an engagement position, in which it engages the toothed profile of the locking arm, and a disengagement position, in which it is disengaged from said toothed profile.

6. The steering column assembly according to claim 5, wherein the locking pin is biased from its disengagement position to its engagement position under the action of a return spring.

7. The steering column assembly according to claim 1, wherein it further comprises a second locking element, the second locking element comprising, a first set of thin friction plates joined to the steering shaft housing unit and a second set of thin friction plates joined to the vehicle body, each friction plate of the second set being disposed between two adjacent friction plates of the first set, a compression element arranged to apply a compression force on the friction plates of the first and second sets to lock the steering shaft housing unit relative to the vehicle body and, control means adapted to control the compression force applied by the compression elements.

8. The steering column assembly according to claim 7, wherein the compression element comprises a support bar along which are slidably mounted the first and second sets of friction plates and a piston, the piston pressing against the friction plates when it moves toward the ends of the support bar.

9. The steering column assembly according to claim 8, wherein the control means comprise a cylinder adapted to induce a sliding movement to the piston through a fork element coupled to the piston.

10. The steering column assembly according to claim 1, wherein the steering wheel is pivotally connected to the steering shaft housing unit about a third shaft and in that the steering column assembly further comprises third adjusting means adapted to adjust the angular position of the steering wheel relative to steering shaft housing unit and third locking means adapted to lock the steering wheel in a locked position.

11. The steering column assembly according to claim 10, wherein the third locking means comprise a locking lever having a tooth profile, the locking lever being movable under the action of a cylinder between a locked position, in which teeth of said toothed profile are engaged with corresponding teeth of a gear fixed to an upper rotatable part integral in rotation with the steering wheel, and a release position, in which the teeth of the toothed profile are disengaged from the teeth of the gear.

12. A vehicle comprising a steering column assembly according to claim 1.

* * * * *